United States Patent
Oigawa

(10) Patent No.: US 11,827,148 B2
(45) Date of Patent: Nov. 28, 2023

(54) DISPLAY CONTROL DEVICE, DISPLAY CONTROL METHOD, MOVING BODY, AND STORAGE MEDIUM

(71) Applicant: CANON KABUSHIKI KAISHA, Tokyo (JP)

(72) Inventor: Makoto Oigawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 17/712,810

(22) Filed: Apr. 4, 2022

(65) Prior Publication Data

US 2022/0314886 A1 Oct. 6, 2022

(30) Foreign Application Priority Data

Apr. 5, 2021 (JP) ................. 2021-064111

(51) Int. Cl.
*B60R 1/23* (2022.01)
*G06V 40/18* (2022.01)
(Continued)

(52) U.S. Cl.
CPC ............... *B60R 1/23* (2022.01); *B60K 35/00* (2013.01); *G02B 27/0101* (2013.01); *G06T 11/00* (2013.01); *G06V 20/58* (2022.01); *G06V 40/18* (2022.01); *B60K 2370/1529* (2019.05); *B60K 2370/166* (2019.05); *B60K 2370/176* (2019.05);
(Continued)

(58) Field of Classification Search
CPC ................ B60R 1/23; B60R 2300/802; B60R 2300/105; B60R 2300/205; B60R 1/25; B60K 35/00; B60K 2370/1529; B60K 2370/166; B60K 2370/176; B60K 2370/178; B60K 2370/21; B60K 2370/52; B60K 2370/741; G02B 27/0101; G02B 2027/0138; G02B 2027/0141; G02B 2027/0123; G02B 2027/014; G02B 2027/0145; G06T 11/00; G06T 11/60; G06V 20/58; G06V 40/18; G06V 20/597
See application file for complete search history.

(56) References Cited

U.S. PATENT DOCUMENTS 8,553,087 B2 10/2013 Yanai
8,830,044 B2 9/2014 Fukumachi
(Continued)

FOREIGN PATENT DOCUMENTS

JP 2001194161 A 7/2001
JP 2005173882 A 6/2005
(Continued)

*Primary Examiner* — Farzana Hossain
(74) *Attorney, Agent, or Firm* — Canon U.S.A., Inc. IP Division

(57) ABSTRACT

A display control device acquires sight line information about a direction of a visual field of a driver of a moving body, viewpoint information about a start point of the visual field of the driver, and map information around the moving body. The display control device acquires a blind spot region of the driver on the basis of the acquired sight line information, viewpoint information, and surroundings information. In addition, the display control device performs control of generating display information on the basis of the surroundings information about the blind spot region and displaying the display information on a display device.

19 Claims, 19 Drawing Sheets

(51) Int. Cl.
    *G06V 20/58*      (2022.01)
    *B60K 35/00*      (2006.01)
    *G02B 27/01*      (2006.01)
    *G06T 11/00*      (2006.01)

(52) U.S. Cl.
    CPC .... *B60K 2370/178* (2019.05); *B60K 2370/21* (2019.05); *B60K 2370/52* (2019.05); *B60K 2370/741* (2019.05); *B60R 2300/802* (2013.01); *G02B 2027/0138* (2013.01); *G02B 2027/0141* (2013.01)

(56) References Cited

U.S. PATENT DOCUMENTS

| | | |
|---|---|---|
| 9,586,582 B2 | 3/2017 | Nagata et al. |
| 2005/0128061 A1 | 6/2005 | Yanai |
| 2013/0033368 A1 | 2/2013 | Fukamachi |
| 2015/0142285 A1 | 5/2015 | Nagata et al. |
| 2020/0207358 A1* | 7/2020 | Katz ................ G01C 21/3697 |

FOREIGN PATENT DOCUMENTS

| | | | |
|---|---|---|---|
| JP | 2012216176 A | 11/2012 | |
| JP | 2014002460 A | 1/2014 | |
| JP | 2018073036 A | 5/2018 | |
| WO | 2011129014 A1 | 10/2011 | |

\* cited by examiner

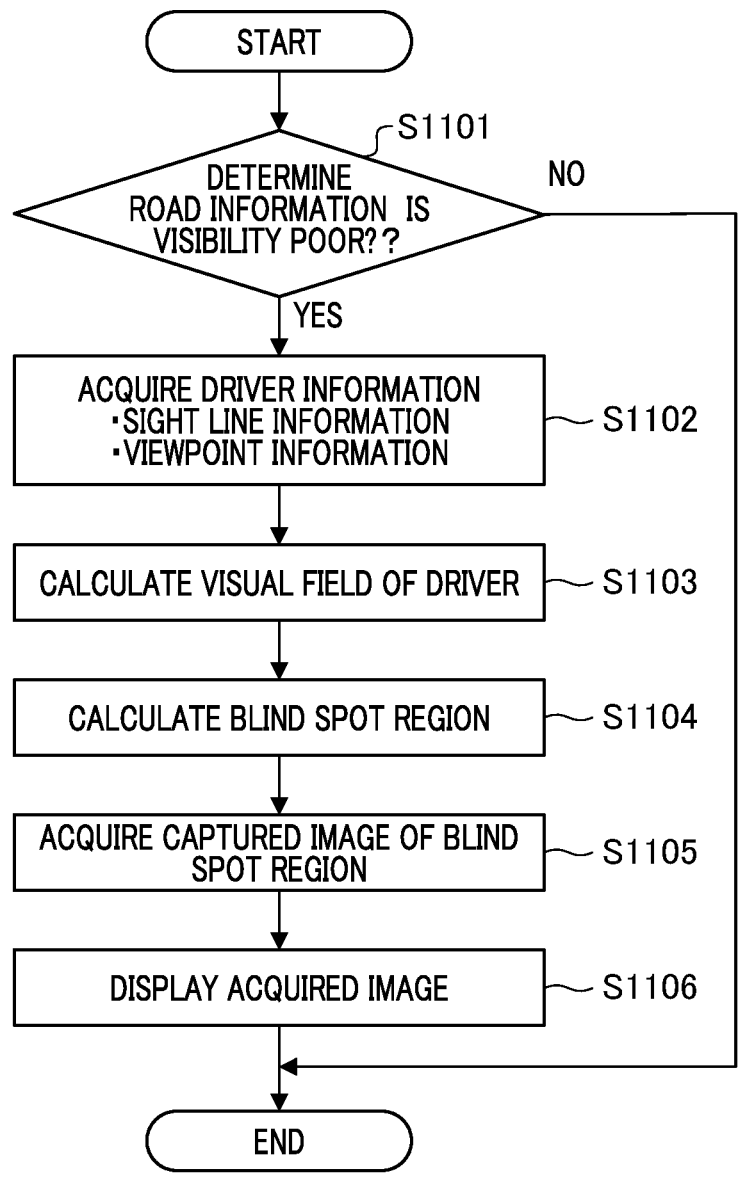

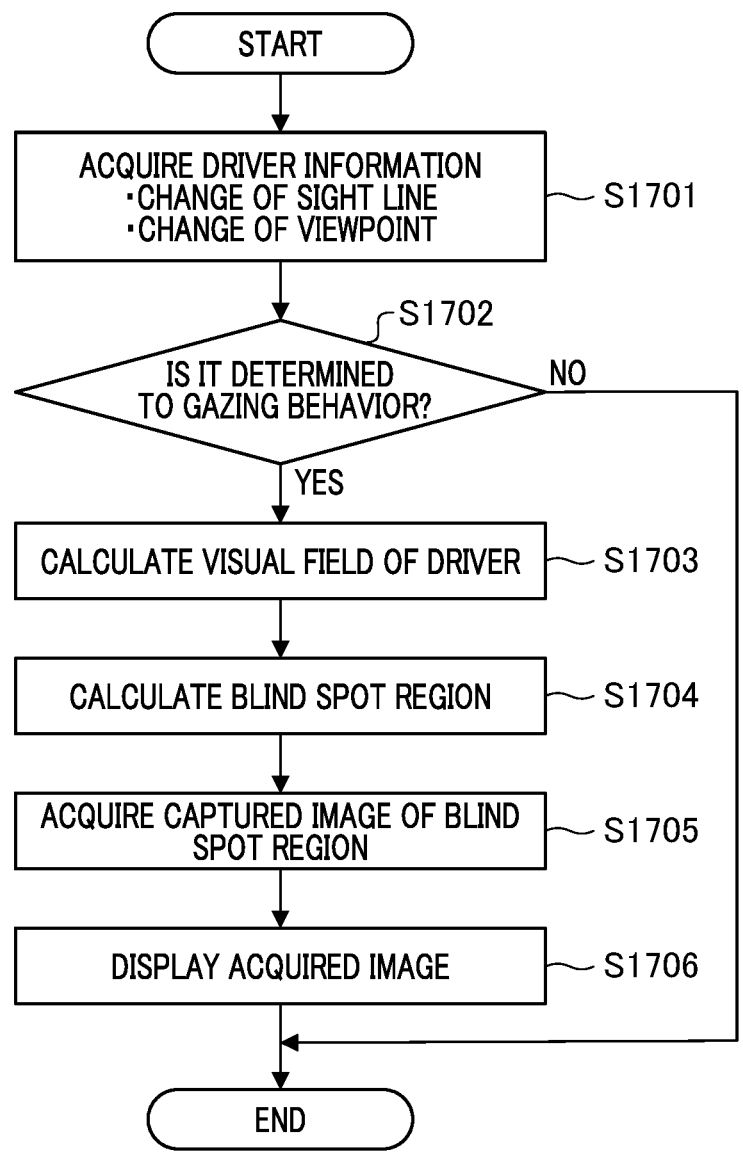

DISPLAY CONTROL DEVICE, DISPLAY CONTROL METHOD, MOVING BODY, AND STORAGE MEDIUM

BACKGROUND

Field of the Disclosure

The present disclosure relates to a display control device, a display control method, a moving body, and a storage medium.

Description of the Related Art

An information display device that estimates a visual field using a sight line detected in an image obtained by imaging a driver of an automobile and provides driving assistance according to the estimated visual field has been proposed. Japanese Patent Laid-open No. 2018-73036 discloses an image display system that estimates a blind spot region from a visual field of a passenger of a vehicle and displays a captured image of the blind spot region.

The image display system disclosed in Japanese Patent Laid-open No. 2018-73036 calculates the visual field of the passenger on the basis of a detected sight line, but since a variation in a position of a head of a passenger depending on a physique or a driving posture thereof is not taken into consideration, a viewpoint of the visual field may not be accurate, and the visual field and the blind spot region may not be able to be calculated accurately.

SUMMARY

Some embodiments of the present disclosure make it possible to present display information to a user in accordance with a visual field of the user.

A display control device according to an embodiment of the present disclosure includes: a first acquisition unit configured to acquire sight line information about a direction of a visual field of a user of a moving body; a second acquisition unit configured to acquire viewpoint information about a start point of the visual field of the user; a third acquisition unit configured to acquire map information around the moving body; and a control unit configured to perform control of acquiring a blind spot region of the user on the basis of the sight line information, the viewpoint information, and the surroundings information and generating display information on the basis of surroundings information about the blind spot region and displaying the display information on a display unit.

Further features of various embodiments will become apparent from the following description of exemplary embodiments with reference to the attached drawings.

BRIEF DESCRIPTION OF THE DRAWINGS

FIG. 12 is a flowchart illustrating operation processing of a display control device of a second example.

FIG. 18 is a flowchart illustrating operation processing of a display control device of a fifth example.

DESCRIPTION OF THE EMBODIMENTS

First Example

Figure 1:
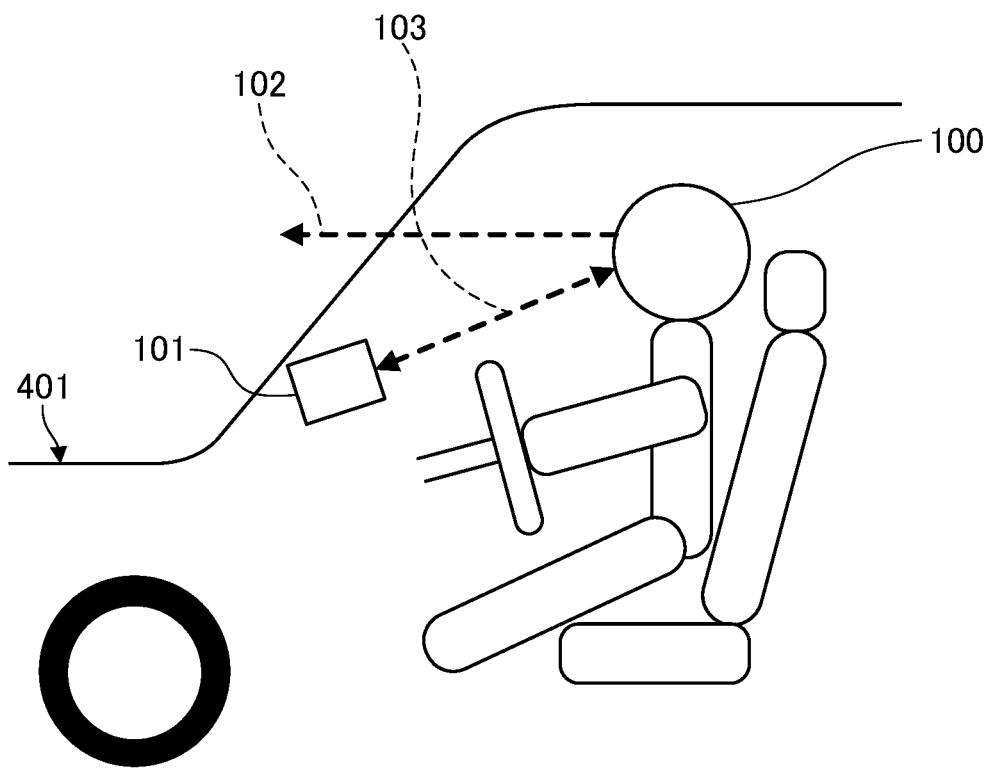
FIG. 1 is a diagram showing a moving body having a display control device of the present embodiment.

FIG. 1 is a diagram showing a moving body having a display control device of the present embodiment. A moving body 401 is, for example, an automobile (an automobile four-wheeled vehicle), and a driver 100 is in a driver's seat. An in-vehicle imaging device 101 is provided in front of the driver's seat (on a front side). The in-vehicle imaging device 101 calculates sight line information 102 and viewpoint information 103 of the driver on the basis of image information obtained by imaging the driver 100. The viewpoint information 103 includes a distance between the in-vehicle imaging device 101 and a viewpoint of the driver 100. The viewpoint is a start point of a visual field of the driver 100, that is, a start point that defines a range of an angle of the visual field. Also, the moving body in an applicable range of the present disclosure is not limited to an automobile. The present disclosure is applicable to any moving body, such as a vehicle including a bicycle, a motorcycle, and the like, a ship, or a flying object. Further, the applicable range of the present disclosure is not limited to a driver of a moving body. The present disclosure is applicable to any user of a moving body, such as a passenger of a moving body.

Figure 2:
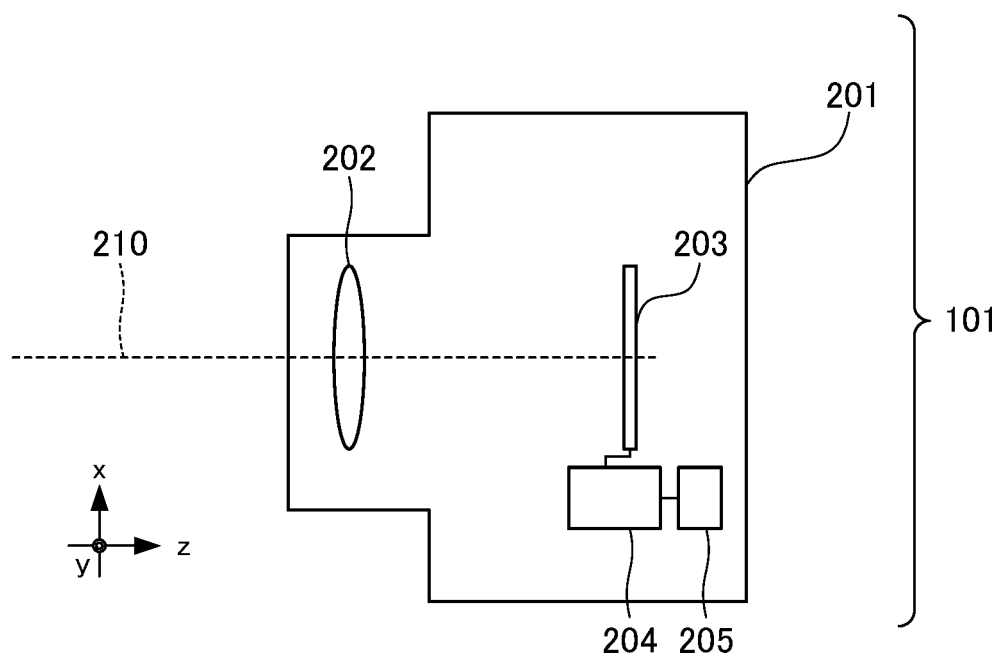
FIG. 2 is a diagram showing a configuration example of an in-vehicle imaging device.

FIG. 2 is a diagram showing a configuration example of the in-vehicle imaging device. A main body unit 201 of the in-vehicle imaging device 101 includes an imaging optical system 202, an imaging element 203, an arithmetic processing unit 204, and a memory 205. The imaging optical system 202 has an optical axis 210 and guides subject light to the imaging element 203. The imaging element 203 photoelectrically converts the subject light and outputs an image signal. The arithmetic processing unit 204 generates captured image data on the basis of the image signal output by the imaging element 203, executes various processing as necessary, and stores the captured image data in the memory 205. In addition, the arithmetic processing unit 204 calculates and outputs the sight line information and the viewpoint information of the driver 100. Further, the in-vehicle imaging device 101 has a communication unit (not shown) and exchanges various information with a central processing unit (CPU) (not shown) provided in the moving body 401. The display control device of the present embodiment is realized by the arithmetic processing unit 204 and the CPU of the moving body 401.

Figure 3A:
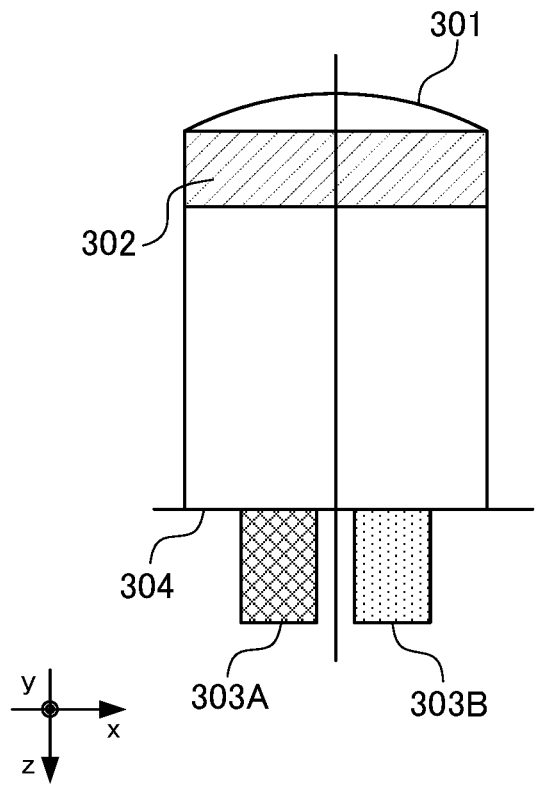
FIGS. 3A and 3B are diagrams showing a configuration example of an imaging element.
Figure 3B:
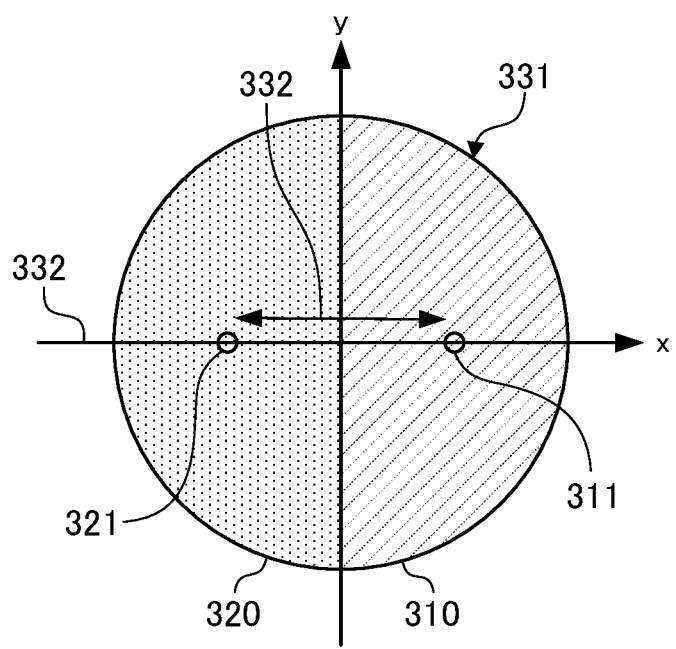

FIGS. 3A and 3B are diagrams showing a configuration example of the imaging element. A plurality of pixels are disposed on the imaging element 203. FIG. 3A shows an example of a cross-section of a pixel of the imaging element 203. Each pixel has a micro lens 301, a color filter 302, and a plurality of photoelectric conversion units 303A and 303B.

The imaging element 203 is given red, green, blue (RGB), or infrared (IR) spectral characteristics for each pixel in accordance with a wavelength band which is detected by the color filter 302. The color filters 302 are disposed in accordance with a known color scheme (not shown). A photoelectric conversion unit having sensitivity to the wavelength band to be detected is formed in a substrate 304. Further, each pixel includes wiring (not shown).

FIG. 3B shows a state in which an exit pupil 331 of the imaging optical system 202 is viewed from an intersection point (a central image height) of the optical axis 210 and the imaging element 203. Luminous fluxes that have passed through different regions of the exit pupil 331 are incident on the photoelectric conversion unit 303A and the photoelectric conversion unit 303B. A first light flux that has passed through a first pupil region 310 is incident on the photoelectric conversion unit 303A, and a second light flux that has passed through a second pupil region 320 is incident on the photoelectric conversion unit 303B. The photoelectric conversion unit 303A and the photoelectric conversion unit 303B perform photoelectric conversion of the incident light fluxes and output image signals. That is, the imaging element 203 outputs a pair of image signals corresponding to the light fluxes passing through different pupil regions of the imaging optical system. The photoelectric conversion unit 303A outputs an image signal (A image signal) according to an A image, and the photoelectric conversion unit 303B outputs an image signal (B image signal) according to a B image.

The arithmetic processing unit 204 calculates distance information through ranging arithmetic processing on the basis of the A image signal and the B image signal and stores the result in the memory 205. Further, the image obtained by adding the A image and the B image can be used as image information.

Reference numeral 311 in FIG. 3B indicates a center of gravity position of the first pupil region 310 (a first center of gravity position), and reference numeral 321 indicates a center of gravity position of the second pupil region 320 (a second center of gravity position). The first center of gravity position 321 is eccentric (moved) along a first axis (x axis) from a center of the exit pupil 331. The second center of gravity position 321 is eccentric (moved) along the first axis (x axis) in a direction opposite to the first center of gravity position 311. A direction connecting the first center of gravity position 311 and the second center of gravity position 321 is a pupil division direction, and an inter-centroidal distance between the center of gravity position 311 and the center of gravity position 321 is a baseline length 332. Positions of the A image and the B image are deviated by defocusing in the same direction as the pupil division direction by an amount corresponding to the baseline length. A relative positional deviation between the images, that is, an amount of parallax between the A image and the B image is an amount corresponding to an amount of defocusing. Accordingly, by acquiring the amount of parallax using a known method and performing conversion based on a geometrical relationship with the baseline length, the amount of parallax can be converted into the amount of defocusing and further the distance information.

For a known method for obtaining the amount of parallax, a correlation calculation method called Sum of Absolute Difference (SAD) or Sum of Squared Difference (SSD) can be used. Further, the amount of parallax can also be obtained by using a correlation calculation method such as Zero means Normalized Cross Correlation (ZNCC) or Phase Only Correlation (POC). The in-vehicle imaging device 101 described above functions as a monocular ranging camera based on the pupil division method and can calculate a distance to a target on the basis of an image signal obtained by imaging. Thus, it is possible to acquire a distance image in which each pixel has a distance value and a recognition image in which each pixel has a pixel value in accordance with a signal intensity in response to a light receiving intensity on the same optical axis, and to reduce a calculation load of post-processing such as that for superposition of both images. The ranging method of the present disclosure is not limited to the above-mentioned method, and a stereo camera realized by two cameras may be adopted. According to the ranging method using a stereo camera, the baseline length can be made long, which is suitable from the viewpoint of improving a distance resolution. Further, an active stereo method in which triangulation is performed between a pattern projector and a camera, a stereo method in which texture projection performed by a pattern projector is used in combination therewith, a time of flight (ToF) method, or the like may be applied.

Figure 4A:
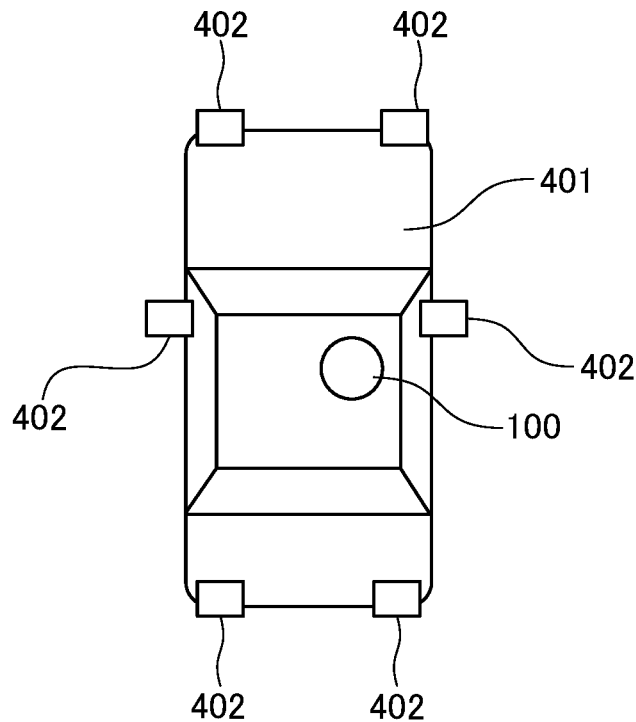
FIGS. 4A and 4B are diagrams showing the moving body and a state when viewed forward from a driver's seat.
Figure 4B:
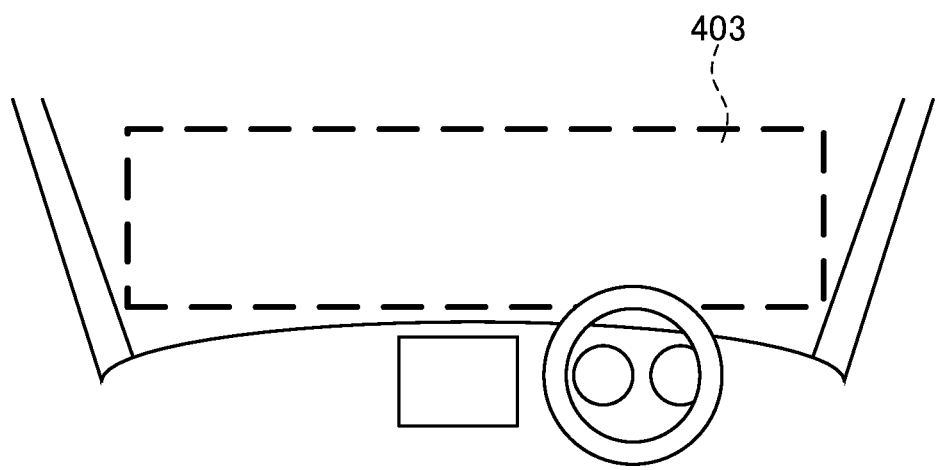

FIGS. 4A and 4B are diagrams showing the moving body in which the driver is onboard and a state when viewed forward from the driver's seat in the moving body. FIG. 4A shows a state when the moving body 401 is viewed from above. A plurality of surroundings imaging devices 402 for imaging regions around the moving body 401 are disposed on outer peripheral portions of the moving body 401. The surroundings imaging device 402 is one of units for acquiring surroundings information of the moving body. Each surroundings imaging device 402 has a zoom optical system with a variable focal length and can acquire an image having an appropriate angle of view in accordance with a situation. The in-vehicle imaging device 101 that photographs the driver and the surroundings imaging device 402 that acquires the surroundings information of the moving body 401 are associated with each other by managing their camera positions and attachment directions (optical axes) through calibration when installed. That is, the in-vehicle imaging device 101 and the surroundings imaging device 402 are addressed to a local coordinate system having the origin on the moving body 401.

FIG. 4B shows a state when viewed forward from the driver's seat. A display device 403 having a head-up display (HUD) is provided in a lower portion of a front windshield, which is a window portion on a front side of the moving body 401. The display control device included in the moving body 401 displays display information acquired (e.g., generated) on the basis of the surroundings information about a blind spot region of the driver on the display device 403. The display information includes, for example, image information (captured images) obtained by imaging the blind spot region.

The display device 403 may be installed not only at the lower portion of the front windshield but also at an appropriate optimum region on upper, lower, left, and right sides thereof, on a side glass, on a back surface of a front seat for a passenger in a rear seat, or the like. Further, the display device 403 is not limited to the HUD and may have various displays, such as a liquid crystal display in an operation panel in front of the driver's seat.

The moving body 401 acquires (e.g., generates) the display information by performing various processing from the acquired various information using a CPU (not shown) and displays it on a display unit. In addition, various processing can be performed using various arithmetic circuits, such as GPUs; devices, such as PCs equipped with GPUs; and various cloud computing that executes processing of information serving as a processing target at a remote location by wireless communication. "GPU" is an abbreviation for a graphics processing unit.

Figure 5:
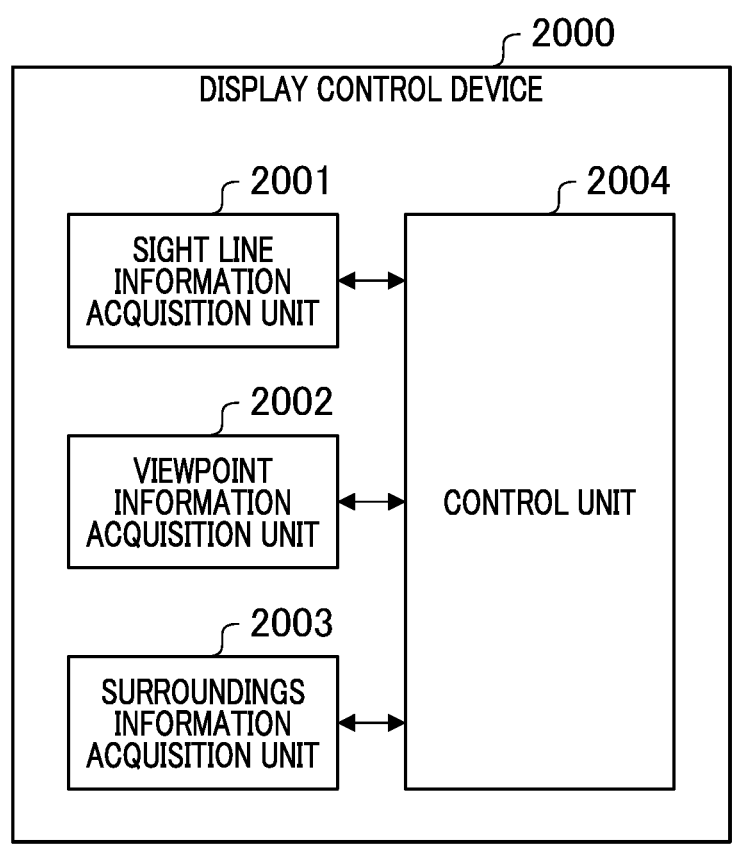
FIG. 5 is an example of a functional block diagram of the display control device included in the moving body.

FIG. 5 is an example of a functional block diagram of the display control device of the moving body. A display control device 2000 has a sight line information acquisition unit 2001, a viewpoint information acquisition unit 2002, a surroundings information acquisition unit 2003, and a control unit 2004. The sight line information acquisition unit 2001 functions as a first acquisition unit for acquiring the sight line information of the driver 100 of the moving body 401. The viewpoint information acquisition unit 2002 functions as a second acquisition unit for acquiring the viewpoint information of the driver 100. The surroundings information acquisition unit 2003 functions as a third acquisition unit for acquiring the surroundings information about surroundings of the moving body 401. The surroundings information acquisition unit 2003 acquires the surroundings information from the surroundings imaging device 402, a global positioning system (GPS) included in the moving body 401, or light detection and ranging (LiDAR). The control unit 2004 controls the entire display control device 2000. For example, the control unit 2004 acquires information on the blind spot region of the driver 100 on the basis of the sight line information, the viewpoint information, and the surroundings information. In addition, the control unit 2004 performs control of generating the display information on the basis of the surroundings information about the blind spot region and displaying it on the display device 403 (FIG. 4B). For example, the control unit 2004 controls the surroundings imaging device disposed at a position suitable for imaging the blind spot region, thereby executing imaging of the blind spot region and generating captured images obtained by the imaging as the display information.

In the present embodiment, the display control device 2000 is realized by the arithmetic processing unit 204 included in the in-vehicle imaging device 101 and the CPU of the moving body 401, but the display control device 2000 may be realized by the in-vehicle imaging device 101 alone. Also, the display control device 2000 may be realized by the CPU of the moving body 401 alone.

Figure 6:
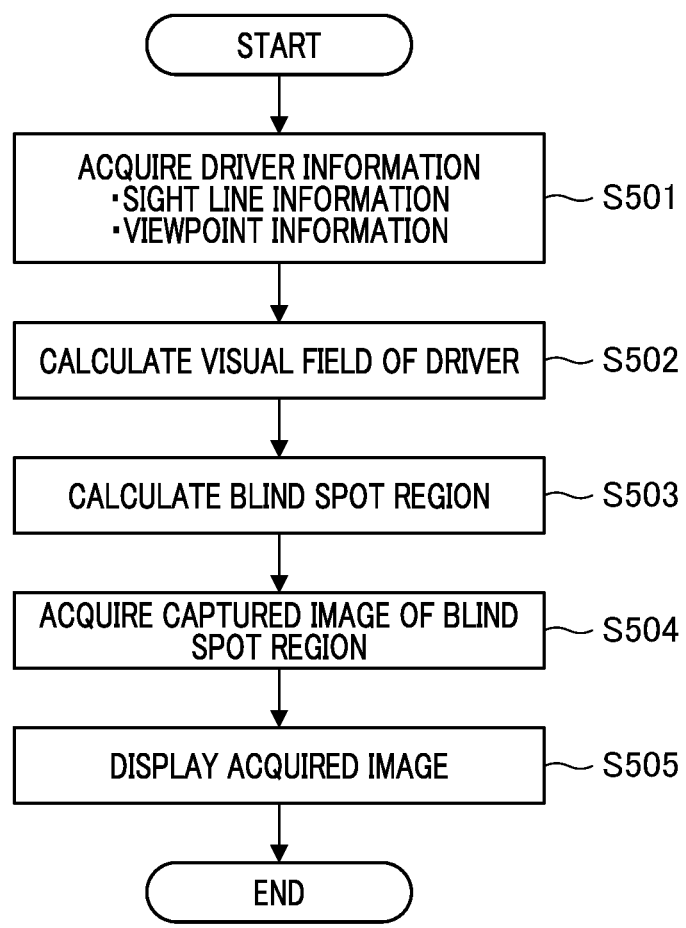
FIG. 6 is a flowchart illustrating operation processing of a display control device of a first example.

FIG. 6 is a flowchart illustrating operation processing of the display control device of a first example. "S" in FIG. 6 indicates a step number of each processing in accordance with the present flowchart. In S501, the display control device 2000 acquires driver information. The driver information is the sight line information and the viewpoint information of the driver 100. The sight line information is obtained by the arithmetic processing unit 204 included in the in-vehicle imaging device 101 that performs processing of the captured images obtained by the imaging of the driver 100 using a known method. A sight line of the driver 100 indicates a direction of the visual field of the driver 100, and it can be said that the sight line information is information about the direction of the visual field of the driver 100.

For example, a light source (not shown) is provided in the vicinity of the in-vehicle imaging device 101, and a face of the driver 100 is imaged in a state in which it is irradiated with light from the light source. The arithmetic processing unit 204 extracts a region near his or her eye from a captured image, detects a Purkinje image, which is a reflected point of the light from the light source on a cornea of the eye, and calculates the sight line from a relative positional relationship with a pupil position calculated separately. More specifically, the arithmetic processing unit 204 calculates a center of curvature of the cornea from a position of the Purkinje image and a position of the pupil and uses a vector connected from the center of curvature of the cornea to a center of the pupil as the sight line. Since the arithmetic processing unit 204 calculates the sight line based on a reflected image due to the light source, the sight line can be stably detected even when an amount of light is scarce, such as at night. The method of calculating the sight line is not limited to the present method, and a method of calculating a sight line in which positions of an inner corner of the eye and an iris are detected, and the sight line is calculated on the basis of the position of the iris with respect to the position of the inner corner of the eye, may be applied. According to the method of calculating the sight line, it is not necessary to separately install a light source for sight line detection, which is suitable from the viewpoint of reduction in size.

Next, acquiring the viewpoint information will be explained. In this example, the viewpoint is set to the center of the pupil. The arithmetic processing unit 204 calculates a distance to the pupil from a captured image obtained by imaging the driver 100 using the above-mentioned method. In addition, coordinates of the pupil are addressed to the local coordinate system of the moving body 401 via the camera position of the in-vehicle imaging device 101. That is, the coordinates of the pupil are addressed to a position moved by a calculated distance from the camera position in the optical axis direction. That is, the viewpoint information is shown as a distance between the in-vehicle imaging device 101 and the pupil of the driver 100 shown in the local coordinate system defined for the moving body 401. In other words, it can be said that the viewpoint information is information indicating a start point of the visual field of the driver 100 in the local coordinate system defined for the moving body 401. In the subsequent processing, the arithmetic processing unit 204 calculates one visual field for the driver 100 on the basis of the sight line information and the viewpoint information. Accordingly, the arithmetic processing unit 204 calculates intermediate coordinates of calculated coordinates of left and right pupils as the viewpoint of the driver.

Also, the viewpoint that is the start point of the visual field of the driver is not limited to central coordinates of the left and right pupils. In addition to positions of the glabella and an apex of the nose of the driver 100 obtained by imaging, a position of a center of gravity of a face region calculated from various feature points, such as ears, can be used as the viewpoint serving as the start point of the visual field. Since a difference between positions of portions of the driver 100 is minute when the moving body and the blind spot region are calculated, they can be utilized as points having the same meaning. Accordingly, position information of a head of the driver 100 used as the viewpoint is also collectively referred to as head position information. Also, a method of acquiring the viewpoint information is not limited to the method of the present example. A viewpoint position may be determined from results of organ detection acquired by using machine learning from the image obtained by the imaging performed by the in-vehicle imaging device 101.

Also, the method of acquiring the viewpoint information 103 is not limited to the above example. For example, a distance from an imaged in-vehicle imaging device 101 to the pupil of the driver 100 may be measured using a ranging method based on a pupil division method to be set as the viewpoint information 103. Further, an object for which the ranging is performed may be the glabella or the apex of the nose of the driver 100, and the position of the center of gravity of the face region calculated from distances of various feature points, such as the ears of the driver 100, can be used as the viewpoint that is the start point of the visual field. It is also possible to provide a ranging device, such as LiDAR, in the vicinity of the in-vehicle imaging device and acquire the distance between the in-vehicle imaging device 101 and the pupil of the driver 100 using the ranging device.

Next, in S502, the display control device 2000 calculates visual field information on the basis of the sight line information and the viewpoint information of the driver 100 acquired in S501. The calculation of the visual field information may be executed by the arithmetic processing unit 204 or by the CPU of the moving body 401.

Figure 7:
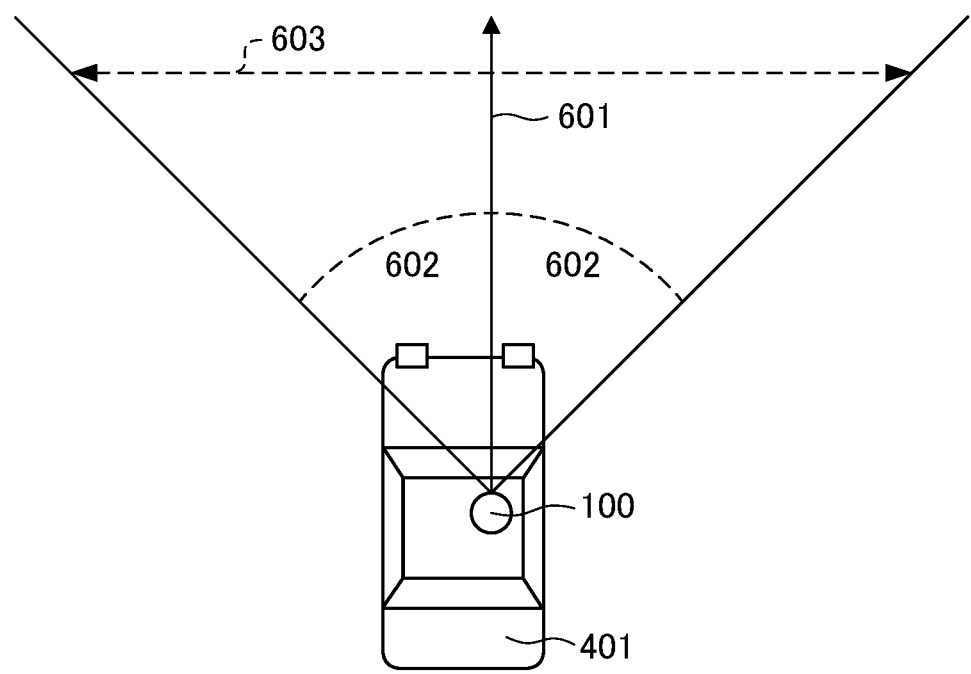
FIG. 7 is a diagram illustrating an example of calculation processing of visual field information.

FIG. 7 is a diagram illustrating an example of calculation processing of the visual field information. The control unit 2004 of the display control device 2000 adds a standard viewing angle 602 to a sight line direction 601 of the driver 100 obtained in S501 in FIG. 6 with the viewpoint which is the start point of the visual field as the origin to calculate a visual field 603 of the driver 100. The standard viewing angle 602 may be appropriately set, and may be set to, for example, ±45° and used for calculating a visual field region. Further, for example, if the weather is rainy, visibility is not good, and thus an appropriate value, such as setting the standard viewing angle to ±30°, may be used. The visual field 603 of the driver 100 used for calculating the blind spot region is calculated on the basis of the standard viewing angle 602 set with the viewpoint as the origin and information of viewpoint position coordinates of the driver acquired in S501 in FIG. 6.

Returning to the illustration of FIG. 6, in S503, the control unit 2004 calculates the blind spot region of the driver around the moving body 401 on the basis of the information of the visual field region calculated in S503.

Figure 8:
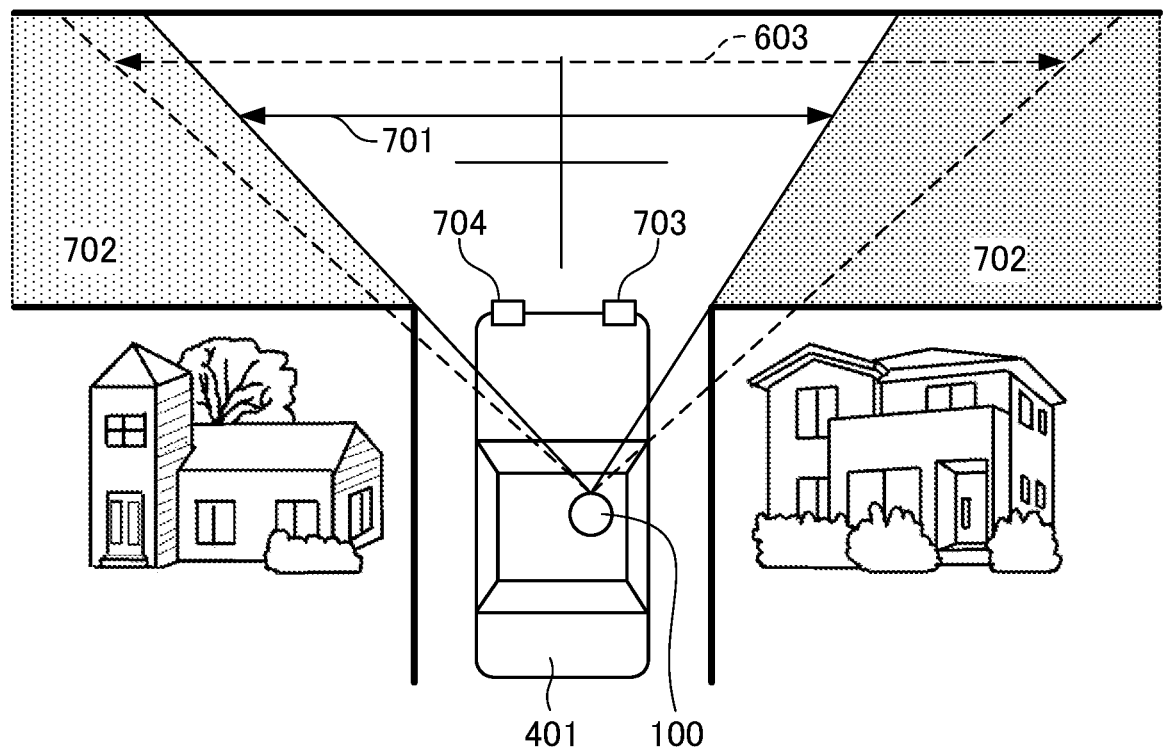
FIG. 8 is a diagram illustrating an example of calculation of a blind spot region.

FIG. 8 is a diagram illustrating an example of calculation of the blind spot region. The control unit 2004 superposes the local coordinate system of the moving body 401 on an environment map around the moving body for the visual field 603 of the driver 100 to calculate a range that is actually visible. The environment map is one of map information around the moving body 401 and shows road conditions, buildings, and the like around the moving body 401. The environment map can be obtained by combining GPS and various dynamic maps that have been provided. Also, the control unit 2004 may construct an environment map using LiDAR separately installed in the moving body 401. If LiDAR is used, it is possible to build a real-time map in response to a sudden change in environment at a site, such as construction.

If there is no obstacle in the surroundings when the local coordinate system of the moving body 401 is superposed on the environment map, the visual field 603 becomes an actually visible range, and a region other than the visual field 603 is the blind spot region. In the example shown in FIG. 8, the moving body 401 is approaching a T-junction, and a part of the visual field 603 is shielded by corners of walls forming the T-junction. Accordingly, the control unit 2004 calculates an actually visible range 701 on the basis of a head position of the driver 100 and calculates a region corresponding to the outside of the range 701 as a blind spot region 702.

Returning to the illustration of FIG. 6, in S504, the control unit 2004 generates the display information on the basis of the blind spot region calculated in S503. In this example, the control unit 2004 acquires image information (a captured image) obtained by imaging the blind spot region using the surroundings imaging device provided on the outer peripheral portions of the moving body 401 and uses it as the display information.

Figure 9A:
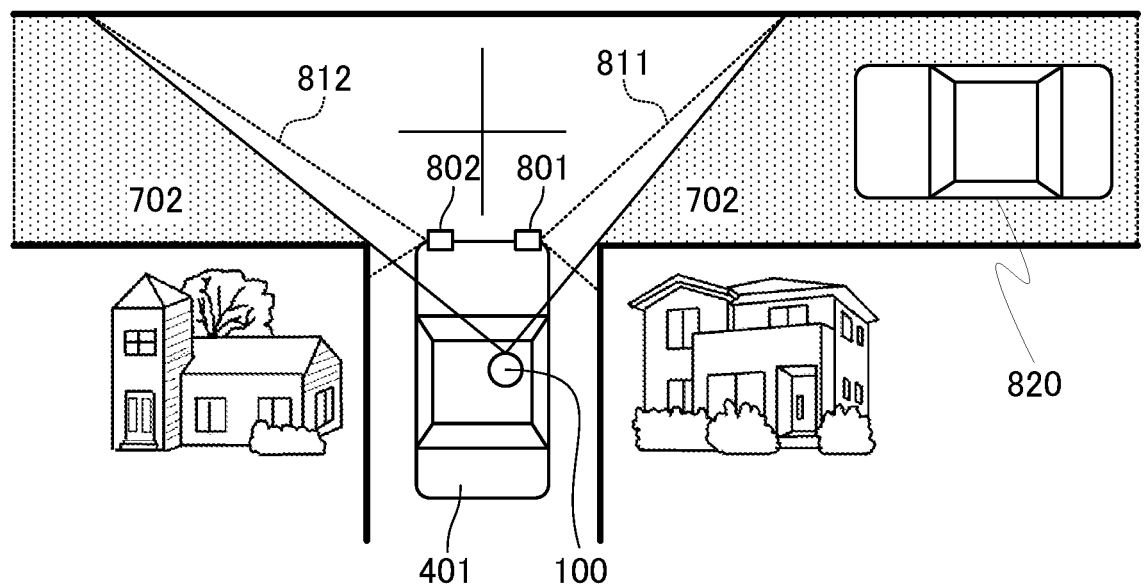
FIGS. 9A and 9B are diagrams illustrating an example of imaging of the blind spot region.
Figure 9B:
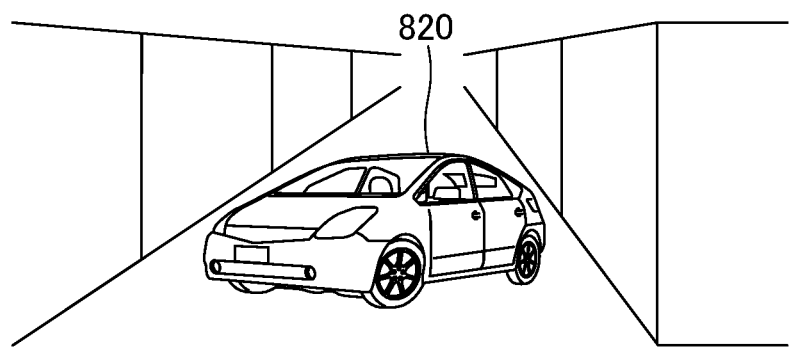

FIGS. 9A and 9B are diagrams illustrating an example of imaging of the blind spot region.

As shown in FIG. 9A, there is the blind spot region 702 in front of the moving body 401, and thus the control unit 2004 selects surroundings imaging devices 801 and 802 installed in front of the moving body 401 as imaging devices for acquiring the captured image of the blind spot region 702. In addition, the control unit 2004 changes the focal length of the zoom optical system so that angles of view 811 and 812 of the surroundings imaging devices 801 and 802 can photograph a range of the blind spot region 702. Thus, if there is a moving body 820 different from the moving body 401 in the blind spot region 702, a captured image of the angle of view 811 including the moving body 820 can be acquired by the surroundings imaging device 801, as shown in FIG. 9B. Also, the optical system of the surroundings imaging device is not limited to the zoom optical system and may be a single focus optical system. If a photographing range that can be acquired with a single focus optical system does not cover the blind spot region 702, the control unit 2004 may display, on the display device 403 as a caution alarm, that the photographing range does not cover the entire blind spot region. Further, the control unit 2004 may display an instruction or the like for slightly advancing the moving body 401 on the display device 403 so that the entire blind spot region can be photographed.

Returning to the illustration of FIG. 6, in S505, the control unit 2004 displays the display information (captured image) about the blind spot region acquired in S504 on the display device 403.

Figure 10:
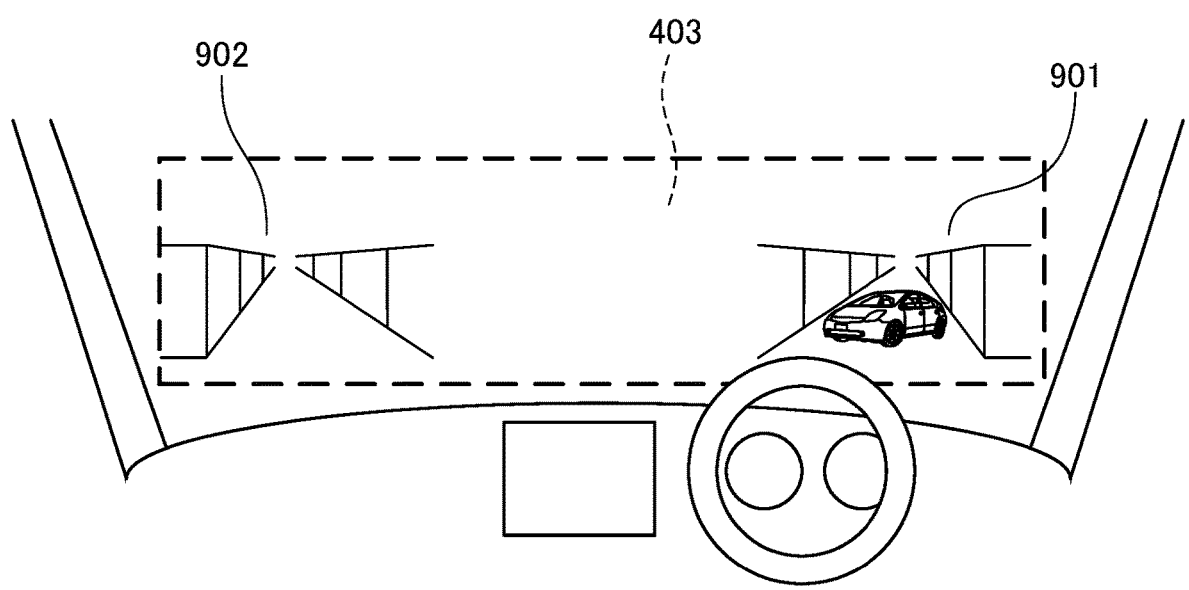
FIG. 10 is a diagram showing a display example of display information.

FIG. 10 is a diagram showing a display example of display information on the display device. The control unit 2004 displays the display information on the display device 403 in association with a direction in which the surroundings information about the blind spot region is acquired. In the example shown in FIG. 10, the control unit 2004 displays a captured image 902 obtained by imaging the blind spot region 702 on a left front side of the moving body 401 using the surroundings imaging device 802 of the moving body 401 in FIG. 9A on a left side of the display device 403. Further, the control unit 2004 displays a captured image 901 obtained by imaging the blind spot region 702 on a right front side of the moving body 401 using the surroundings imaging device 801 of the moving body 401 in FIG. 9A on a right side of the display device 403.

According to the above display example, it is possible to show in what direction the blind spot region, which is not visible to the driver 100, is located with respect to the driver 100. In addition, by displaying the captured images on left and right ends of the display device 403 provided in the lower portion of the front windshield, visibility toward an immediately front side of the moving body 401 can be ensured, which is also suitable from the viewpoint of driving convenience.

Figure 11A:
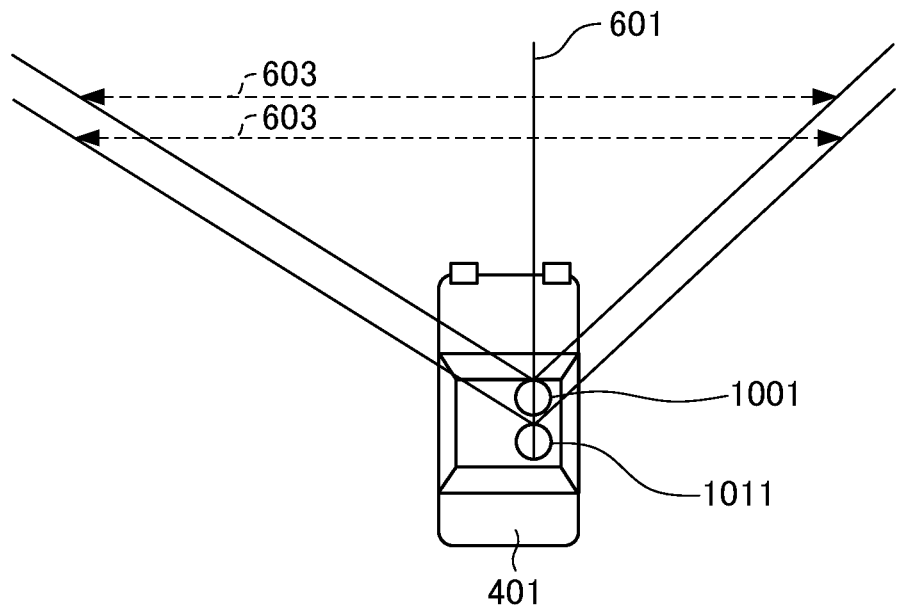
FIGS. 11A and 11B are diagrams for illustrating an effect of the display control device.
Figure 11B:
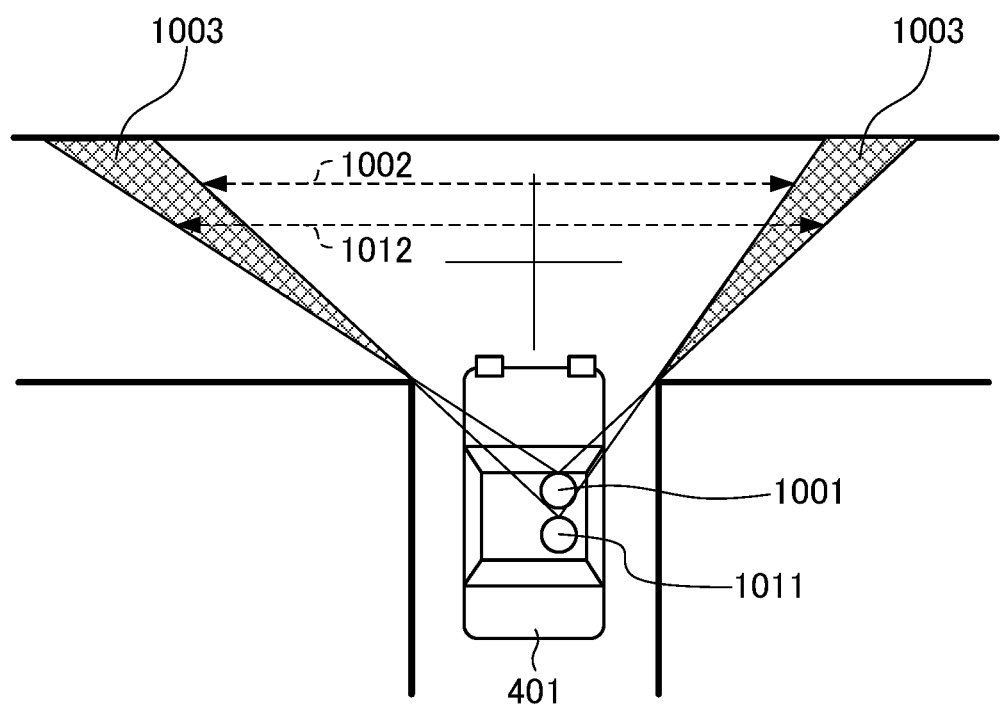

FIGS. 11A and 11B are diagrams for illustrating an effect of the display control device of the present embodiment. As shown in FIG. 11A, even if the visual field 603 with respect to the sight line direction 601 is the same, a visible range varies depending on whether a position serving as the start point of the visual field is the driver's viewpoint 1001 or a passenger's viewpoint 1011. By setting the position that is the start point of the visual field as the viewpoint 1001, a range that can be visually recognized by the driver can be calculated with high accuracy.

FIG. 11B shows a state in which the moving body 401 is approaching a T-junction. If the start point of the visual field is assumed to be the viewpoint 1001, the visible range is a range 1012. If the start point of the visual field is assumed to be the viewpoint 1011, the visible range is a range 1002. Accordingly, depending on whether the start point of the visual field is the viewpoint 1001 or the viewpoint 1011, a difference of an amount of the region 1003 occurs in the visible range, and an error occurs in the calculation of the blind spot region by the amount of the region 1003. Since the display control device 2000 calculates the visual field information of the driver on the basis of the viewpoint serving as the start point of the visual field of the driver, accuracy of calculating the visual field information is improved as compared with a case in which the visual field information is calculated without using the viewpoint.

Second Example

FIG. 12 is a flowchart illustrating operation processing of a display control device of a second example. "S" in FIG. 12 indicates a step number of each processing in accordance with the present flowchart. The display control device 2000 of the second example controls display of the display information on the display device 403 on the basis of a traffic condition in which the moving body 401 is placed, which is obtained on the basis of the surroundings information of the moving body 401. Further, the display control device 2000 estimates a direction in which the blind spot region of the driver is generated on the basis of the traffic condition in which the moving body 401 is placed and generates the display information on the basis of the surroundings information obtained from the region in the estimated direction.

For example, as shown in FIG. 8, the moving body 401 is assumed to reach an intersection point, such as the T-junction. In S1101 in FIG. 12, the control unit 2004 determines whether the traffic condition that the moving body 401 is about to reach is a situation of poor visibility with a high probability that the blind spot region will occur on the basis of the environment map acquired by the surroundings information acquisition unit 2003. If the traffic condition based on the environment map indicates that the moving body 401 has approached the intersection point having a road width equal to or less than a threshold, the intersection point is selected as an intersection point candidate with poor visibility. Then, if it can be predicted that the intersection point candidate will be reached within a predetermined time on the basis of a position, a traveling direction, and a traveling speed of the moving body 401, the control unit 2004 determines that the moving body 401 is reaching the traffic condition with poor visibility. Then, the process proceeds to S1102. In S1101 described above, the direction in which the blind spot region of the driver is generated is further estimated on the basis of the traffic conditions based on the environment map. In this example, it is estimated that the blind spot region of the driver is generated on forward left and right sides of the moving body 401.

On the other hand, if the intersection point candidate with poor visibility is not selected, or if the moving body 401 does not reach the intersection point candidate within the predetermined time, the control unit 2004 determines that the moving body 401 does not reach the traffic condition with poor visibility. Then, the process ends.

Basic processing of S1102 to S1106 is the same as that of S501 to S505 in FIG. 6 described above. The display control device 2000 calculates the visual field on the basis of the driver information and calculates the blind spot region by comparing the surroundings information of the moving body 401 (S1102 to S1104). As described above, it is estimated in advance that the blind spot region of the driver is generated on the forward left and right sides of the moving body 401. Accordingly, in S1105, the control unit 2004 gives priority to and performs imaging and image processing of the surroundings imaging devices 703 and 704 (FIG. 8) capable of imaging the region in the estimated direction (a predicted blind spot direction). Then, in S1106, the control unit 2004 displays the captured image obtained in the processing of S1105 on the display device 403.

Since the display control device 2000 of the second example gives priority to and performs the imaging and the image processing of the region in the direction predicted to be a blind spot of the driver in advance, it is possible to display information in a direction considered necessary for driving assistance of the driver at a higher update speed. Further, since display of information in unnecessary directions is reduced, a chance of obstructing the drive's field of vision is reduced, which is suitable from the viewpoint of safety.

Third Example

Similarly to the display control device 200 of the second example, a display control device 2000 of a third example controls the display of the display information on the display device 403 on the basis of the traffic condition in which the moving body is placed, which is obtained on the basis of the surroundings information of the moving body.

Figure 13:
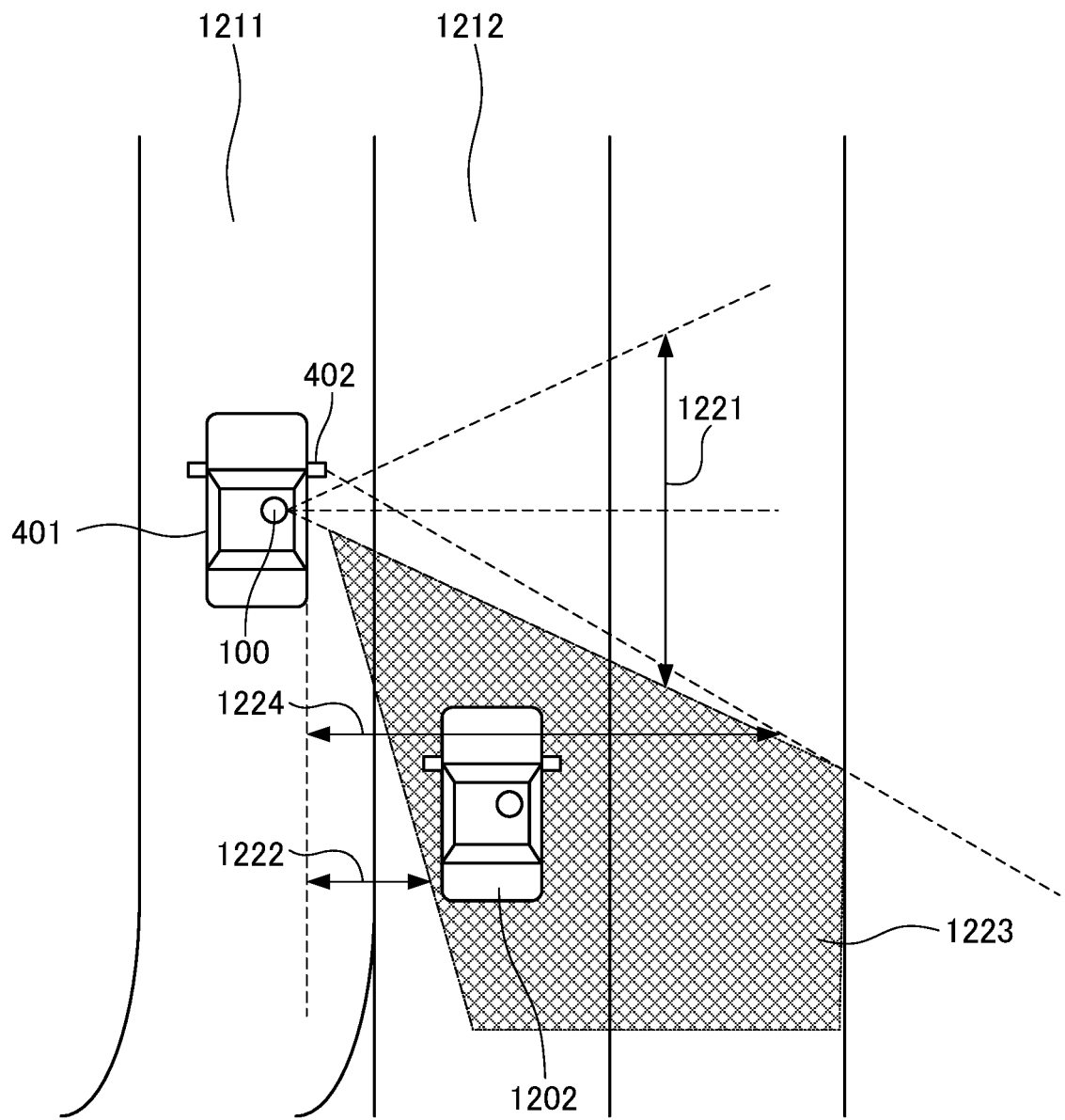
FIG. 13 is a diagram showing an example of traffic conditions in which the moving body is placed.
Figure 14:
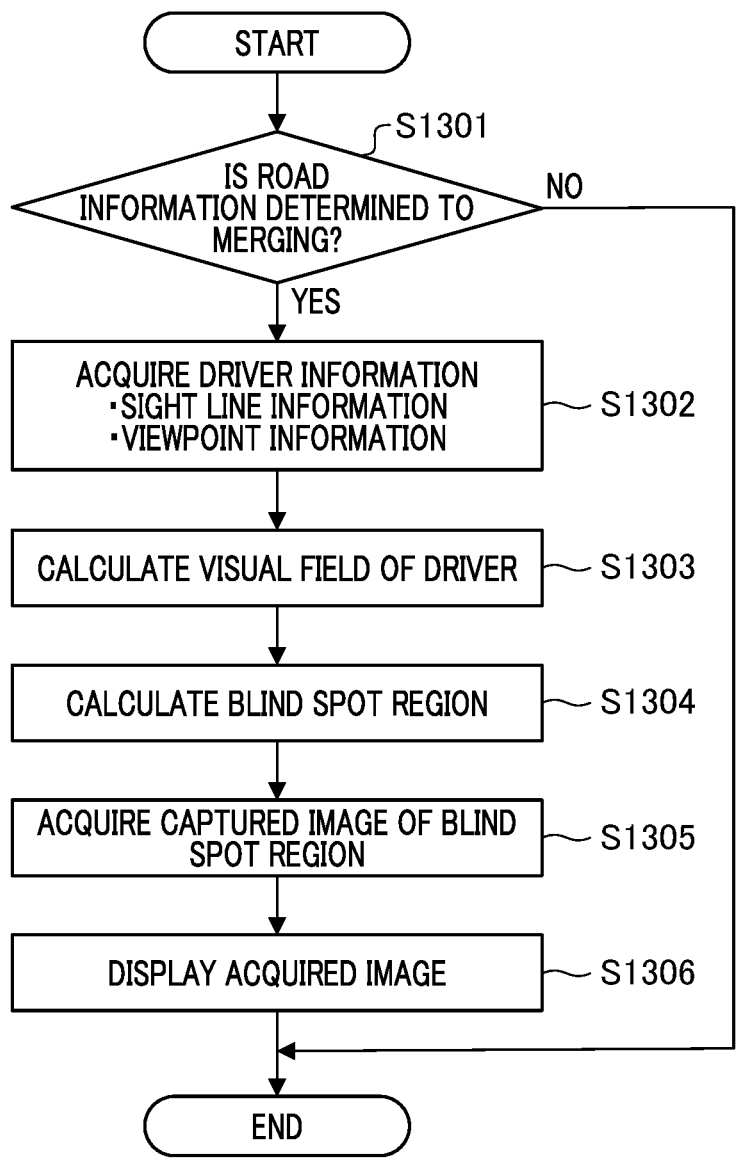
FIG. 14 is a flowchart illustrating operation processing of a display control device of a third example.

FIG. 13 is a diagram showing an example of the traffic condition in which the moving body is placed. FIG. 13 shows a situation in which the moving body 401 merges from a merging lane 1211, which is a first route, to a traveling lane (a main lane) 1212, which is a second route. Further, FIG. 14 is a flowchart illustrating operation processing of the display control device according to the third example. "S" in FIG. 14 indicates a step number of each processing in accordance with the present flowchart.

In S1301 in FIG. 14, the control unit 2004 of the moving body 401 determines whether or not the traffic condition that the moving body 401 is about to reach, which is obtained on the basis of the environment map, indicates that the moving body 401 merges from the merging lane to the traveling lane. If the traffic condition does not indicate that the moving body 401 merges from the merging lane to the traveling lane, the process ends. If the traffic condition indicates that the moving body 401 merges from the merging lane to the traveling lane, the process proceeds to S1302. For example, if the driver 100 operates a blinker of the moving body 401 to indicate an intention of merging, the control unit 2004 determines that the moving body 401 merges from the merging lane to the traveling lane. Further, if the merging lane 1211 merges with the traveling lane 1212 (becomes one lane) in front of the moving body 401 in the traveling direction, the moving body 401 needs to move to the traveling lane 1212. Accordingly, in this case as well, the control unit 2004 determines that the traffic condition is such that the moving body 401 merges from the merging lane to the traveling lane.

In S1302, the control unit 2004 acquires the driver information (the sight line information and the viewpoint information) of the driver 100 of the moving body 401. Subsequently, in S1303, the control unit 2004 calculates the visual field of the driver 100 of the moving body 401. The control unit 2004 calculates a visual field 1221 (first visual field information) in a case in which the driver 100 sees in a direction of the traveling lane 1212, which is a merging destination. Further, the control unit 2004 calculates second visual field information of the driver via a light reflecting member for reflecting a rear side of the moving body 401. Specifically, the control unit 2004 calculates a visual field 1222 through a side mirror as the second visual field information when the driver 100 sees the side mirror provided on a merging destination side (a right side) of the moving body 401. The side mirror is provided with the surroundings imaging device 402. Also, the surroundings imaging device 402 may be provided separately from the side mirror.

Next, in S1304, the control unit 2004 calculates a blind spot region 1223 of the driver 100 on the basis of the visual field 1221 and the visual field 1222. Subsequently, in S1305, the control unit 2004 acquires a captured image of the blind spot region 1223 by controlling the surroundings imaging device 402 having an angle of view 1224 capable of imaging the blind spot region 1223. Then, in S1306, the control unit 2004 displays the captured image of the blind spot region 1223 on the display device 403. Thus, it is possible to present the image of the moving body 1202 traveling in the traveling lane 1212, which has been in the blind spot region in the visual field 1221 of the driver 100, to the driver 100.

Fourth Example

If there is a caution target in the blind spot region of the driver 100 of the moving body 401, a display control device 2000 of a fourth example displays the display information based on the surroundings information about the blind spot region on the display device 403 together with an alert notification.

Figure 15A:
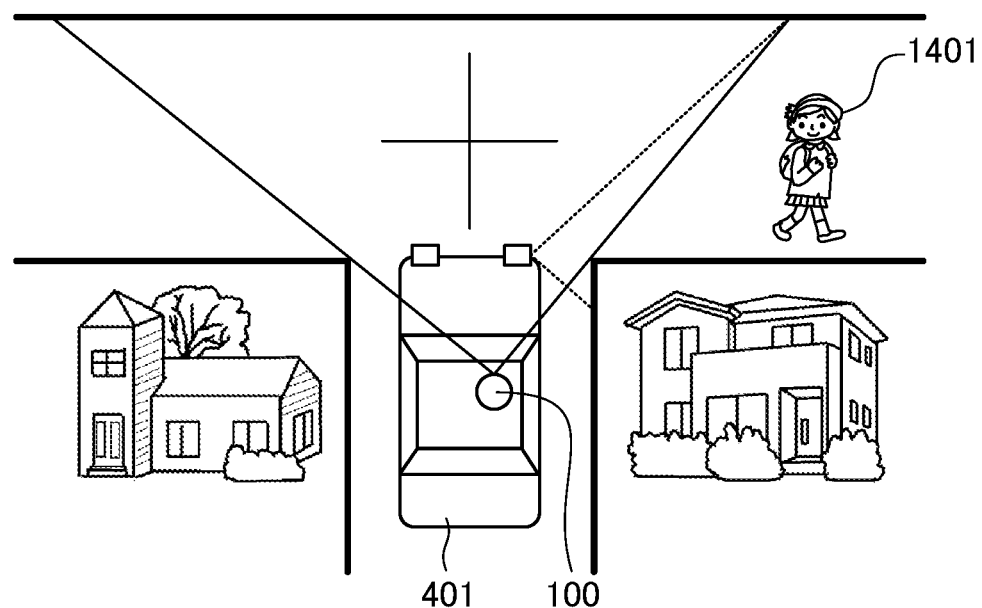
FIGS. 15A and 15B are diagrams for illustrating a display example in a case in which there is a caution target in the blind spot region.
Figure 15B:
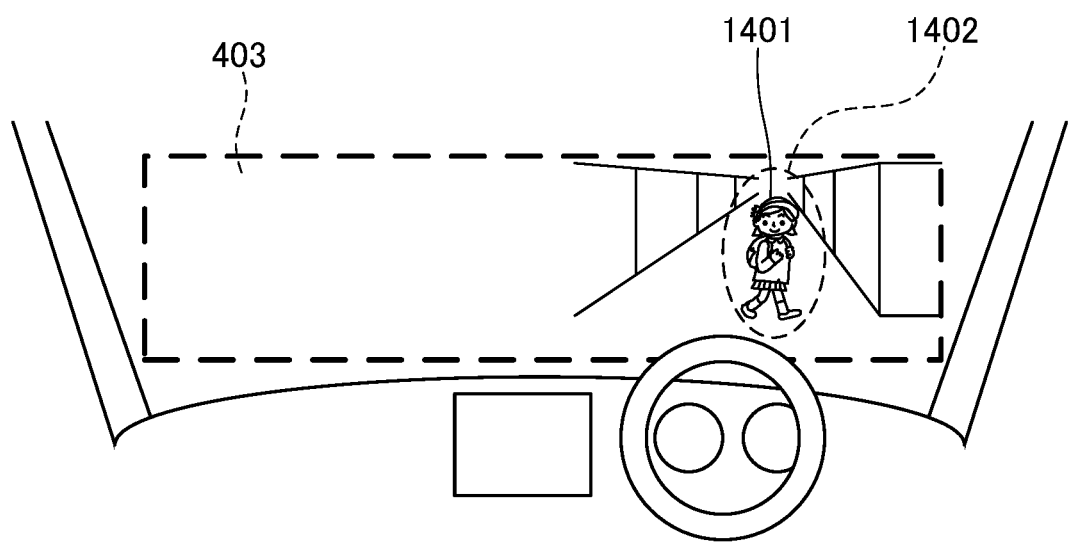
Figure 16:
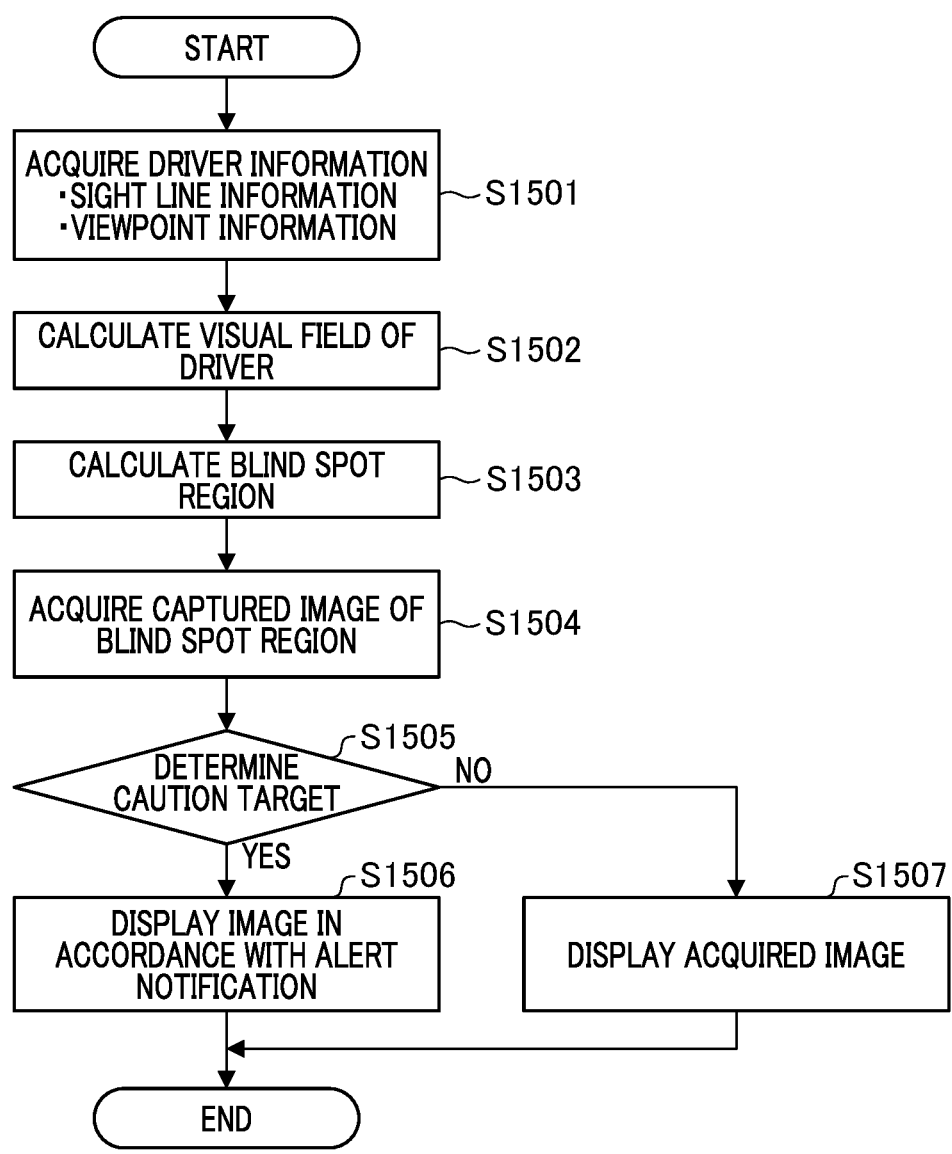
FIG. 16 is a flowchart illustrating operation processing of a display control device of a fourth example.

FIGS. 15A and 15B are diagrams illustrating a display example in a case in which there is a caution target in the blind spot region of the driver. Further, FIG. 16 is a flowchart illustrating operation processing of the display control device according to the fourth example. "S" in FIG. 16 indicates a step number of each processing in accordance with this flowchart.

S1501 to S1504 in FIG. 16 are the same as S501 to S504 in FIG. 6. Also, S1507 is the same as S505 in FIG. 6.

In S1505, the control unit 2004 determines whether or not there is a caution target in the captured image of the blind spot region acquired in S1504. The caution target is, for example, a person, such as a child; an animal; or various moving bodies, such as an automobile, a bicycle, or a motorcycle. In this example, the control unit 2004 performs semantic segmentation (semantic region division) using a recognition algorithm trained in advance using machine learning and determines whether or not there is a region corresponding to a caution target candidate registered in advance. As shown in FIG. 15A, if there is a child 1401, which is a caution target candidate, in the blind spot region of the driver 100 of the moving body 401 that has reached an intersection point, the control unit 2004 determines that there is a caution target image in the captured image of the blind spot region. Then, the process proceeds to S1506. If the control unit 2004 determines that there is no caution target in the captured image of the blind spot region, the process proceeds to S1507. Then, in S1507, the control unit 2004 displays the captured image of the blind spot region on the display device 403 together with the alert notification.

FIG. 15B shows a display example in a case in which there is the child 1401 in FIG. 15A in the blind spot region.

The control unit 2004 displays a captured image of the child 1401 on the display device 403 together with a frame 1402 indicating the alert notification. The frame 1402 blinks and emits light with an alarm color, such as a red color. The frame 1402 and the captured image of the child 1401 are displayed on a right side of the display device 403 corresponding to a direction in which the captured image of the child 1401 is acquired. The control unit 2004 may be caused to notify with a voice from a speaker in the moving body 401 that there is a caution target in the blind spot region on a right side in the traveling direction. Thus, it is possible to inform the driver 100 that there is a caution target in the blind spot region with higher certainty. Further, even if the target displayed on the display device 403 is not a caution target candidate, in a case in which it is determined on the basis of the sight line information of the driver 100 that the driver 100 has not recognized the target, the control unit 2004 may perform an alert notification to promote recognition.

Fifth Example

A display control device 2000 of a fifth example determines whether the driver 100 is performing a gazing behavior on the basis of a change in the sight line information or a change in the viewpoint information of the driver 100. If it is determined that the driver 100 is performing a gazing behavior, the display control device 2000 generates the display information on the basis of the surroundings information about the blind spot region in a gazing direction of the driver 100.

Figure 17A:
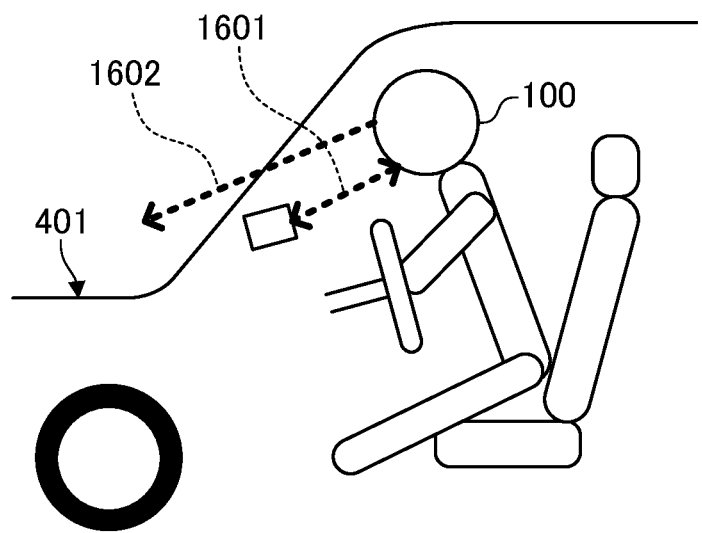
FIGS. 17A and 17B are diagrams for illustrating operation processing of a display control device of a fifth example.
Figure 17B:
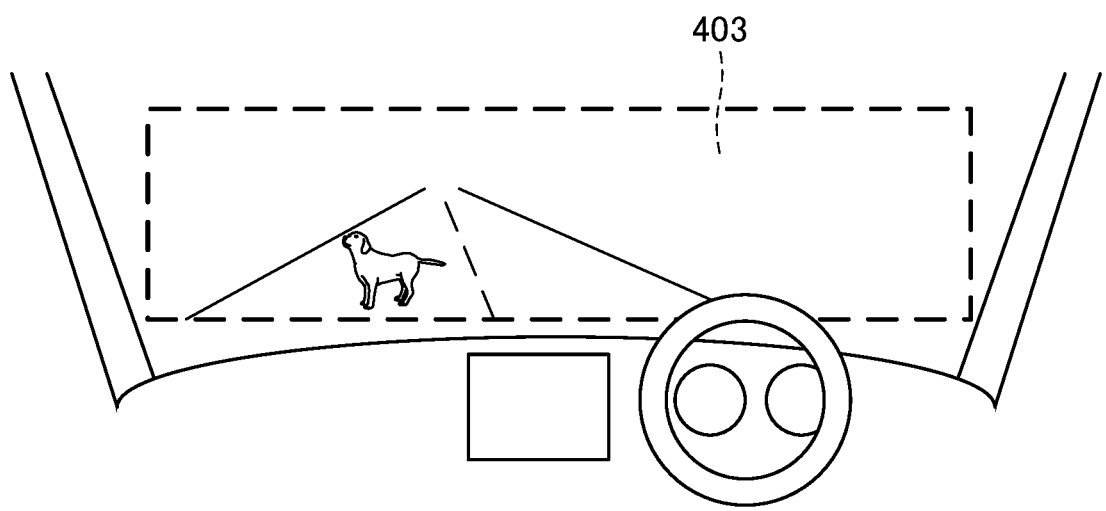

FIGS. 17A and 17B are diagrams illustrating operation processing of the display control device of the fifth example. Also, FIG. 18 is a flowchart illustrating operation processing of the display control device of the fifth example. "S" in FIG. 18 indicates a step number of each processing in accordance with this flowchart.

In S1701 in FIG. 18, the display control device 2000 acquires the sight line information and the viewpoint information of the driver 100 as the driver information. Subsequently, in S1702, the control unit 2004 determines whether or not the driver 100 is performing a gazing behavior. Specifically, the control unit 2004 compares the driver information acquired in a previous frame with the driver information acquired in S1701 and detects a change in a viewpoint 1601 or a change in a sight line 1602 of the driver 100 shown in FIG. 17A. The control unit 2004 determines whether or not a time during which the driver 100 is looking at a region corresponding to the sight line is equal to or longer than a predetermined time on the basis of the detected change in the viewpoint 1601 or the change in the sight line 1602. If the time during which the driver 100 is looking at the region corresponding to the sight line is equal to or longer than the predetermined time, the control unit 2004 determines that the driver 100 is performing a gazing behavior. In the example shown in FIG. 17A, the driver 100 is gazing at a lower front portion of the moving body 401. Accordingly, the control unit 2004 determines that the driver 100 is performing a gazing behavior, and the process proceeds to S1703. If it is determined that the time during which the driver 100 is looking at the region corresponding to the sight line is not equal to or longer than the predetermined time, the control unit 2004 determines that the driver 100 is not performing a gazing behavior. Then, the process ends.

In S1703, the control unit 2004 calculates the visual field information of the driver 200 on the basis of the sight line information and the viewpoint information of the driver 100. Thus, the visual field corresponding to the gazing direction of the driver 100 can be obtained. Subsequently, the control unit 2004 calculates the blind spot region in the gazing direction of the driver 100 on the basis of the visual field information of the driver 100, the surroundings information of the moving body 401, and the information about the moving body 401 itself. The information about the moving body 401 itself includes, for example, dimensional information, such as a height, a width, and a length of the moving body 401. In the example shown in FIG. 17A, since the driver 100 is gazing at the lower front portion of the moving body 401, the blind spot region in a direction of the lower front portion of the moving body 401 is calculated.

Subsequently, in S1705, the control unit 2004 acquires the captured image of the calculated blind spot region. Then, in S1706, the control unit 2004 displays the acquired captured image of the blind spot region on the display device 403 as shown in FIG. 17B. According to the display control device of the fifth example, since the captured image can be acquired from the blind spot region in the gazing direction of the driver 100 and displayed, it is possible to display necessary information at a necessary time in accordance with a state of the driver 100, which is suitable from the viewpoint of improving driving safety.

Sixth Example

Figure 19A:
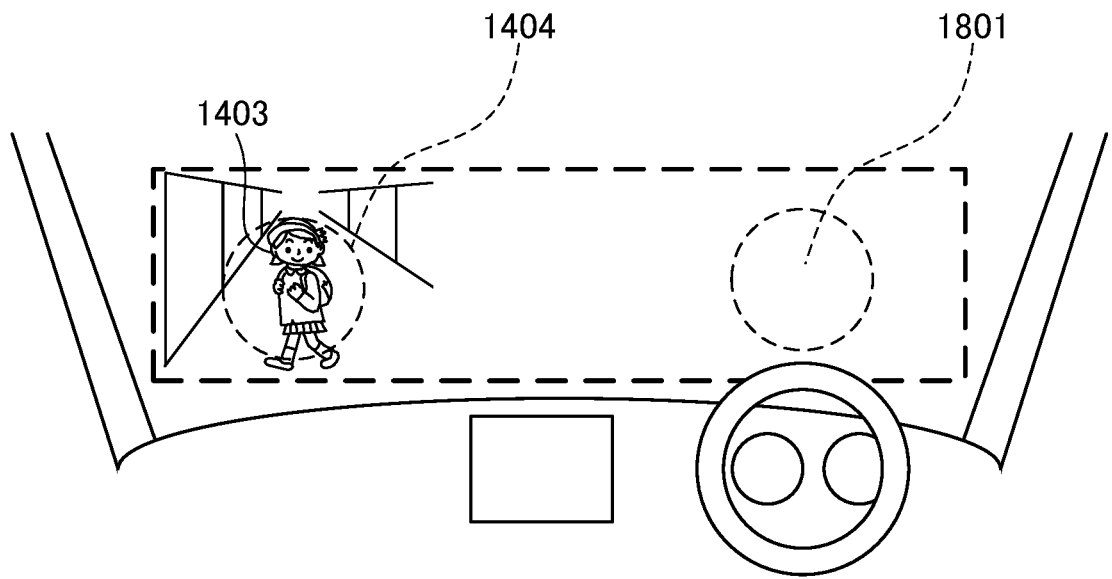
FIGS. 19A and 19B are diagrams showing a display example of display information performed by a display control device of a sixth example.
Figure 19B:
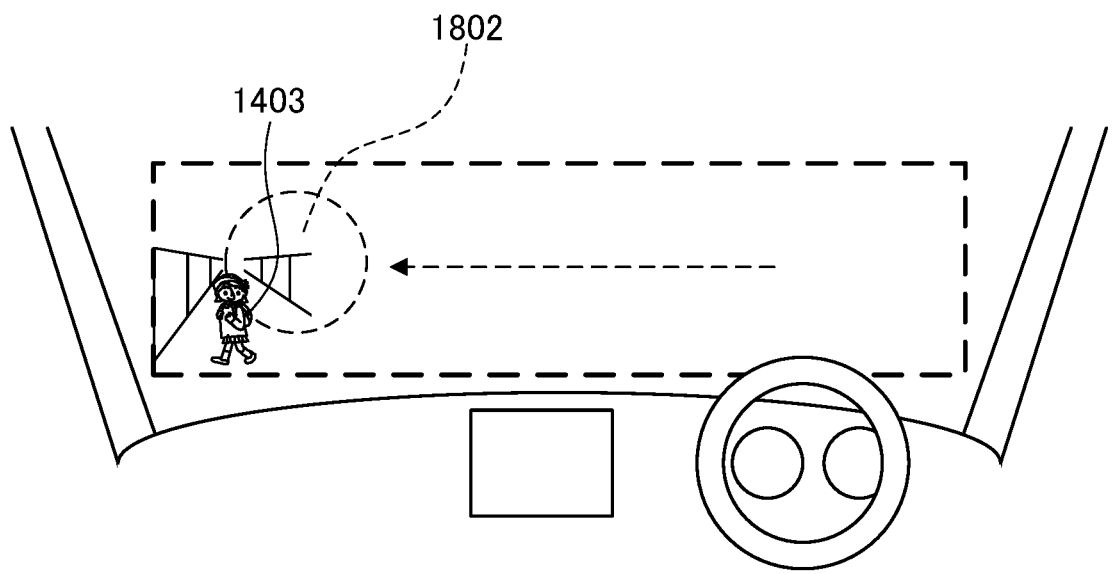

A display control device 2000 of a sixth example performs control of changing a display method of the display information on the display device 403 in accordance with the gazing direction of the driver. FIGS. 19A and 19B are diagrams showing a display example of the display information performed by the display control device of the sixth example. FIG. 19A shows a display example in a case in which there is a caution target in the blind spot region of the driver of the moving body that has reached an intersection point. The control unit 2004 acquires a captured image of a child 1403, which is a caution target present in the blind spot region, and displays it on a left side of the display device 403 together with a frame 1404 indicating an alert notification. At this time, the control unit 2004 determines a region (a gazing region) that the driver is gazing at from the sight line information and the viewpoint information of the driver obtained by the in-vehicle imaging device 101. In the example shown in FIG. 19A, it is assumed to be determined that the driver is gazing at a gazing region 1801 in front of the moving body.

From the state shown in FIG. 19A, it is assumed that the gazing region of the driver has moved from the gazing region 1801 to a region on the left side of the display device 403, in which the captured image of the child 1403 is displayed, in accordance with the alert notification. From the sight line information and the viewpoint information of the driver, the control unit 2004 detects that the gazing region of the driver has moved to the gazing region 1802 in the vicinity of the displayed captured image of the child 1403, as shown in FIG. 19B. Then, the control unit 2004 reduces the displayed captured image of the child 1403 and cancels the alert notification.

If it is determined that the driver has received the alert notification, the display control device 2000 of the sixth example reduces and displays the display information not to obstruct the visual field of the driver. Thus, the driver can also pay attention to the front side of the moving body, which is suitable from the viewpoint of improving driving safety. Also, some embodiments are not limited to the content described in the above-mentioned examples. Moreover, each examples may be appropriately combined.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-064111, which was filed on Apr. 5, 2021 and which is hereby incorporated by reference herein in its entirety.

What is claimed is:

1. A display control device comprising:
   at least one processor or other circuit configured to function as the following units:
   a first acquisition unit configured to acquire sight line information about a direction of a visual field of a user of a moving body;
   a second acquisition unit configured to acquire viewpoint information about a start point of the visual field of the user;
   a third acquisition unit configured to acquire map information around the moving body; and a control unit configured to perform control of acquiring a blind spot region of the user on the basis of the sight line information, the viewpoint information, and the map information and generating display information on the basis of surroundings information about the blind spot region and displaying the display information on a display unit.

2. The display control device according to claim 1, wherein the control unit acquires the visual field information of the user on the basis of the sight line information and the viewpoint information and acquires the blind spot region on the basis of the acquired visual field information and the map information around the moving body.

3. The display control device according to claim 1, wherein the first acquisition unit acquires the sight line information on the basis of image information of the user obtained by imaging performed by a first imaging unit provided on the moving body, and the second acquisition unit acquires the viewpoint information on the basis of the image information of the user obtained by the imaging performed by the first imaging unit.

4. The display control device according to claim 3, wherein the first imaging unit outputs a pair of image signals corresponding to light fluxes passing through different pupil regions of an imaging optical system, and the second acquisition unit acquires the viewpoint information of the user on the basis of the pair of output image signals.

5. The display control device according to claim 1, wherein the third acquisition unit acquires the map information from a second imaging unit provided on an outer peripheral portion of the moving body, a global positioning system (GPS) included in the moving body, or light detection and ranging (LiDAR).

6. The display control device according to claim 1, wherein the display information includes image information obtained by imaging the blind spot region of the user.

7. The display control device according to claim 1, wherein the control unit displays the display information on the display unit in association with a direction in which the surroundings information about the blind spot region is acquired.

8. The display control device according to claim 1, wherein the control unit controls display of the display information on the display unit on the basis of traffic conditions in which the moving body is placed, which is obtained on the basis of the map information.

9. The display control device according to claim 8, wherein the control unit estimates a direction in which the blind spot region of the user is generated on the basis of the traffic conditions and generates the display information on the basis of the map information acquired from a region in the estimated direction.

10. The display control device according to claim 8, wherein in a case in which the traffic condition indicates that the moving body is approaching an intersection point with a width equal to or less than a threshold, the control unit generates the display information on the basis of the surroundings information acquired from the blind spot region in forward left and right directions of the moving body.

11. The display control device according to claim 8, wherein in a case in which the traffic condition indicates that the moving body merges from a first route to a second route, the control unit acquires the blind spot region of the user on the basis of first visual field information of the user in a case in which the user is able to see in a direction of the second route and second visual field information of the user via a light reflecting member for reflecting a rear side of the moving body, which is provided on the moving body, and generates the display information on the basis of the surroundings information about the acquired blind spot region.

12. The display control device according to claim 1, wherein in a case in which there is a caution target in the blind spot region of the user, the control unit displays the display information based on the surroundings information about the blind spot region on the display unit together with an alert notification.

13. The display control device according to claim 1, wherein the control unit determines whether or not the user is performing a gazing behavior on the basis of a change in the sight line information or a change in the viewpoint information, and generates the display information on the basis of the surroundings information about the blind spot region in a gazing direction of the user in a case in which it is determined that the user is performing the gazing behavior.

14. The display control device according to claim 1, wherein the control unit performs control of changing a display method of the display information on the display unit in accordance with a gazing direction of the user.

15. The display control device according to claim 1, wherein the display unit includes a head-up display provided in a window portion of the moving body.

16. The display control device according to claim 1, wherein the viewpoint information is information indicating a position of a start point of the visual field of the user in a coordinate system defined for the moving body.

17. A moving body comprising:
at least one processor or other circuit configured to function as the following units:
a first acquisition unit configured to acquire sight line information about a direction of a visual field of a user of the moving body;
a second acquisition unit configured to acquire viewpoint information about a start point of the visual field of the user;
a third acquisition unit configured to acquire map information of the moving body;
a control unit configured to perform control of acquiring a blind spot region of the user on the basis of the sight line information, the viewpoint information, and the map information and generating display information on the basis of surroundings information about the blind spot region and displaying the display information on a display unit; and
the display unit configured to display the display information.

18. A display control method comprising:
acquiring sight line information a user of a moving body;
acquiring viewpoint information of the user;
acquiring map information around the moving body; and
performing control of acquiring a blind spot region of the user on the basis of the sight line information, the viewpoint information, and the map information and generating display information on the basis of surroundings information about the blind spot region and displaying the display information on a display unit.

19. A non-transitory storage medium on which a computer program for causing a computer of a display control device to execute a display control method is stored, the method comprising:

acquiring sight line information a user of a moving body;
acquiring viewpoint information of the user;
acquiring map information around the moving body; and
performing control of acquiring a blind spot region of the user on the basis of the sight line information, the viewpoint information, and the map information and generating display information on the basis of surroundings information about the blind spot region and displaying the display information on a display unit.

* * * * *